US012774177B2

(12) United States Patent
Heimsoth et al.

(10) Patent No.: US 12,774,177 B2
(45) Date of Patent: Oct. 27, 2026

(54) APPARATUS AND METHOD FOR STACKING FOOD PORTIONS, IN PARTICULAR PATTIES

(71) Applicant: VEMAG Maschinenbau GmbH, Verden (DE)

(72) Inventors: Andreas Heimsoth, Walsrode (DE); Achim Warnke, Syke (DE); Harald Wagner, Verden (DE)

(73) Assignee: VEMAG Maschinenbau GmbH, Verden (DE)

( * ) Notice: Subject to any disclaimer, the term of this patent is extended or adjusted under 35 U.S.C. 154(b) by 23 days.

(21) Appl. No.: 19/034,709

(22) Filed: Jan. 23, 2025

(65) Prior Publication Data

US 2025/0236476 A1 Jul. 24, 2025

(30) Foreign Application Priority Data

Jan. 23, 2024 (DE) ......................... 102024101917.4

(51) Int. Cl.
*B65G 57/14* (2006.01)
*B65G 37/00* (2006.01)

(52) U.S. Cl.
CPC .......... *B65G 57/14* (2013.01); *B65G 37/005* (2013.01); *B65G 2201/0202* (2013.01)

(58) Field of Classification Search
CPC .................. B65G 57/14; B65G 37/005; B65G 2201/0202; B65G 47/514; B65G 57/112; B65G 57/32; B65G 47/57
See application file for complete search history.

(56) References Cited

U.S. PATENT DOCUMENTS 4,577,453 A 3/1986 Hofeler
7,156,607 B2 * 1/2007 Anderson ............ B65G 57/308 414/789.9
2006/0182613 A1 8/2006 Anderson et al.

FOREIGN PATENT DOCUMENTS

DE 3638538 A1 5/1988
DE 3708604 A1 9/1988
(Continued)

OTHER PUBLICATIONS

Bittler M. H. et al.; "Vertical Buffer in an Automated Assembly Line." IBM Technical Disclosure Bulletin, vol. 26, No. 8, Jan. 1, 1984; pp. 4393-4395, XP001408008.
(Continued)

*Primary Examiner* — Lynn E Schwenning
(74) *Attorney, Agent, or Firm* — Thompson Hine LLP

(57) ABSTRACT

The invention relates to an apparatus for stacking portions made of food mass, in particular patties, comprising a feeder conveyor belt for feeding the portions in a conveying direction and for dispensing the portions at one end of the feeder conveyor belt, a vertical conveyor arranged downstream from the feeder conveyor belt, for conveying the portions in a substantially vertical direction and having at least one substantially vertically movable platform for receiving portions downstream from the feeder conveyor belt. The vertical conveyor is so designed that at least one portion and in particular a plurality of stacked portions can be dispensed from the platform for further transport. The feeder conveyor belt is also mounted and drivable in such a way that the end of the conveyor belt facing the vertical conveyor can be moved vertically up or down in a continuous or intermittent manner while the portions are being conveyed.

13 Claims, 4 Drawing Sheets

(56) References Cited

FOREIGN PATENT DOCUMENTS

| | | | |
|---|---|---|---|
| EP | 1996468 | B1 | 7/2010 |
| FR | 2789666 | A1 | 8/2000 |
| WO | 9824718 | A1 | 6/1998 |
| WO | 2007021763 | A2 | 2/2007 |
| WO | 2007107845 | A1 | 9/2007 |

OTHER PUBLICATIONS

European Patent Office; Extended European Search Report and Opinion issued in European Patent Application No. 25153370.9 on Jun. 10, 2025; 12 pages.
VEMAG Maschinenbau GmbH, "PI355 Paper Interleaver," Data Sheet, (Oct. 7, 2021), 2 pages.
German Patent Office; Examination Report issued in Patent Application No. 102024101917.4 on Oct. 25, 2024; 14 pages.

* cited by examiner

APPARATUS AND METHOD FOR STACKING FOOD PORTIONS, IN PARTICULAR PATTIES

BACKGROUND

The invention relates to an apparatus and a method for stacking food portions, in particular patties.

There is a need in the food industry to provide apparatuses and methods of the kind initially specified with which portioned products, such as patties, can be provided in portions for burgers, cevapcici, or also for pastry and cheese products. Single portions such as burger patties often need to be provided in the form of a stack comprising a plurality of portions. It is often necessary in such cases that the individual portions be provided on a substrate such as a piece of paper or film, or the like, and then stacked. It is for these purposes that the apparatuses initially specified are used.

An example of such an apparatus is the machine made by VEMAG Maschinenbau GmbH with the short product code PI355, in conjunction with a downstream stacking machine. The PI355 machine is referred to as a paper interleaver, as individual portions such as patties are provided on a piece of paper or film on a feeder conveyor belt. To produce a stack, a downstream vertical conveyor is provided that has at least one vertically movable platform on which a plurality of portions can be placed on top of the other to form a stack of portions. If a stack having a desired number of portions has been formed, it can be conveyed away by the vertical conveyor by means of a downstream outfeed conveyor belt or the like, for example to continue packaging the stack.

EP 1 996 468 discloses a method and a device for stacking objects that are fed by means of a horizontal conveyor belt and are placed inside a vertical transporter. U.S. Pat. No. 4,577,453 likewise discloses an apparatus for stacking flat articles. WO 2007/021763 discloses a stacker for food portions, in particular food portions separated by paper or film. Movable platforms for the stack are formed on a conveyor belt.

The disadvantage of apparatuses and methods known from the prior art is that the portions and in particular the stacks comprising a plurality of portions are dispensed or to a certain extent thrown from a height onto an outfeed conveyor belt, which can adversely affect the quality of the product. The shape or cohesion of the patties may be damaged as a result. The conveying and stacking processes may also run discontinuously or intermittently, which may disadvantageously affect the speed of the process.

SUMMARY

The object of the invention is to specify an apparatus and a method for stacking portions made of food mass, in particular patties, which avoid the disadvantages of the prior art and are so designed, in particular, that the quality of the portions and in particular of the stack are improved, and also that damage to the portions in the stack is prevented and that the speed in providing the stack is increased.

According to a first aspect, the invention achieves the object, in an apparatus of the kind initially specified, by the feeder conveyor belt being mounted and drivable in such a way that the end of the conveyor belt facing the vertical conveyor can be moved vertically up or down in a continuous or intermittent manner while the portions are being conveyed.

Due to the fact that the end of the feeder conveyor belt facing the vertical conveyor can be moved vertically up or down during conveying and thus while a stack is being formed, as specified by this aspect of the invention, the individual portions can be placed in a very targeted manner onto a portion that is lower down, or onto a stack that has already been partially formed, and with a drop height that is zero or very small. The vertical movability of the conveyor belt end means that, during the downward movement of the stack already formed, which is moved downwards by means of the vertical conveyor, the end of the feeder conveyor belt can be adjusted to the downward movement of the stack and, in a manner of speaking, can follow its downward movement. In this way, a portion can be placed successively in a gentle manner and at high speed on top of the stack to be formed. If a complete stack having a desired number of portions has been formed, the end of the preferably pivotably mounted feeder conveyor belt can be moved upwards, preferably at a relatively high speed, so that, on the vertical conveyor, further portions can be placed one on top of the other on a platform of the vertical conveyor to form another stack. The advantageous result is that the portions, in particular patties, do not suffer any damage to their shape, because they can be put down more gently. It is possible at the same time for the next stack to be formed in quick succession. In particular, the apparatus is coupled to a paper interleaver, for example to a machine made by VEMAG Maschinenbau GmbH with the short product code PI355.

The apparatus is preferably controlled, or the method according to the invention is carried out, in such a way that the speed of the end of the feeder conveyor belt is adjusted according to the downward speed of the vertical conveyor, i.e., to the downward speed of the platform. The speed of the end of the feeder conveyor belt is preferably less than the downward speed of the vertical conveyor. For example, the speed of the end of the feeder conveyor belt may be half as much, or the same speed, although other dependencies are also possible and practicable, according to the invention.

According to a second aspect of the invention, the object is achieved by an apparatus of the kind initially specified, characterized in that the feeder conveyor belt and the vertical conveyor are driven by means of at least one controller in such a way that the conveyor belt for conveying in the conveying direction and the vertical conveyor and the end of the feeder conveyor belt are driven in synchrony, particularly preferably in a continuous or substantially continuous movement.

Due to the fact that a controller is designed and configured, according to this second aspect of the invention, in such a way that drive means of the feeder conveyor belt and of the vertical conveyor can be controlled such that they can be driven in a substantially continuous or largely continuous movement, or also semi-continuously in an intermittent movement, such that the drive means are coordinated with each other or synchronously controlled, it is possible for a plurality of portions to be gently formed successively and at high speed into a stack comprising a plurality of portions, also and in particular according to the first aspect of the invention as described above. By means of the apparatus, gentle dynamics of continuous or semi-continuous movement can be realized. The drop heights for the portions and stacks can be kept very low, which is beneficial for the quality of the stack. At the same time, it is possible to achieve high process speeds. The apparatus also has a small footprint, which means it requires little space. The various drive means, i.e., the feeder conveyor belt, the drive means for vertically moving the end of the feeder conveyor belt, the drive means for the vertical conveyor, and also, where relevant, the drive means for an outfeed conveyor belt for removing a formed stack, are driven in a continuous movement.

According to a third aspect of the invention, the object is achieved by an apparatus of the kind initially specified, characterized in that an outfeed conveyor belt onto which portions can be dispensed from the vertical conveyor is arranged adjacent the vertical conveyor, and that the platform of the vertical conveyor and the outfeed conveyor belt are arranged relative to each other in such a way that portions can be dispensed directly from the platform onto the outfeed conveyor belt.

According to this aspect of the invention, the portions and a formed stack are gently dispensed directly from a platform of the vertical conveyor onto an outfeed conveyor belt with no drop height and yet with at the highest possible speed. According to the invention, this aspect of the invention can also be combined with the two first and second aspects of the inventions described above.

According to a preferred embodiment, it is proposed that the platform has at least two separate platform sections between which a gap is formed at least temporarily, and that the outfeed conveyor belt has a conveyor belt section which is dimensioned such that it is arranged at least partially inside the gap so as to be able to receive portions from the vertical conveyor. A gap is formed between the two platform sections that together form the platform. Once the stack is finished, the platform is moved so far down that the conveyor belt section of the outfeed conveyor belt protrudes exactly into the gap, and the stack is thus placed gently on this section. The entire stack is then conveyed away. A plurality of stacks are produced and conveyed in the same manner.

It is particularly preferred that the platform sections are each arranged on a circulating drive member and can be driven synchronously to form a platform for receiving portions and for transporting the portions vertically downwards for transfer to the outfeed conveyor belt. Two spaced-apart circulating drive members, in particular flat belts or chains, each have a plurality of spaced-apart platform sections which can be positioned opposite each other and at substantially the same height by means of the two circulating drive members to form a platform so that they are then ready to receive portions which are placed one on top of the other to form a stack. During this process, the stack can be moved downwards by means of the vertical conveyor by driving the circulating drive members, while at the same time portions are each placed on top of the stack from above by means of the feeder conveyor belt. The drive members may each have their own drive means or may have a common drive means that be drive both drive members by means of a suitable transmission gear.

It is particularly preferred that the feeder conveyor belt is designed as a paper interleaver having a device for feeding paper in such a way that a piece of paper or other substrate can be arranged underneath a portion lying on the feeder conveyor belt. The term paper interleaver is to be understood as meaning that paper, in particular, but also a piece of film or other substrate, forms an underlayer on which a portion can be positioned. In this way, a stack can be formed without the individual portions sticking together.

According to a development of the invention, it is proposed that the outfeed conveyor belt has a preferably central conveyor belt section and two conveyor belt sections arranged preferably lateral thereto, which are arranged parallel to each other and can be driven synchronously in a conveying direction. In particular, the central conveyor belt section is designed to be inserted into the slot or gap.

To achieve that purpose, according to the preferred development of the invention, it is proposed that the preferably central conveyor belt section is longer than the conveyor belt sections arranged preferably lateral thereto, and that the central conveyor belt section protrudes into the gap in the platform, wherein in operation, when the platform is moving downwards, a stack comprising a plurality of portions is initially placed on the central conveyor belt section and can then be subsequently conveyed additionally in the conveying direction by the laterally arranged conveyor belt sections.

According to another alternative and preferred embodiment, it is proposed that a controller is configured in such a way that a drive means for the feeder conveyor belt, a drive means of the vertical conveyor, a further drive means for moving the end of the feeder conveyor belt, and a drive means of the vertical conveyor and optionally a drive means of the outfeed conveyor belt, can be controlled in a coordinated manner. The controller may be the apparatus's own controller, or preferably the controller of an upstream or downstream machine, for example a PI355 paper interleaver machine made by VEMAG Maschinenbau GmbH.

In a preferred development of the invention, a product stop member is arranged in the region of the vertical conveyor in such a way that portions dispensed from the feeder conveyor belt onto a platform for the stack to be formed can come to rest on a platform there at the stop member. The product stop member has the advantageous effect that the movement of the dispensed portions in the conveying direction of the feeder conveyor belt is interrupted, in other words that the ejected portion is positioned reliably on the platform or on top of the stack, i.e., that the portions as a whole are aligned on a stack. The product stop member is preferably arranged on a frame section of the vertical conveyor and is preferably in a fixed position. The product stop member is preferably adapted to the shape of the portions; for example, the surface of the product stop member facing the portions may be concave in shape, and may also have a partly semicircular shape so as to be adapted to a substantially round patty shape. However, the stop member can also take other forms. The product stop member is preferably also mounted adjustably, i.e., in different vertical positions, or also in different positions in the horizontal direction, on a frame section of the vertical conveyor. The material that the product stop member is made of may also be elastically deformable or soft, in order to perform a certain damping function in that respect, or to slow the movement of the portions against the product stop member a little more gently. The product stop member may preferably also be designed as an interchangeable part.

According to a method aspect of the invention, the object is achieved by a method of the kind initially specified by the feeder conveyor belt being mounted and driven in such a way that, during conveying, the end of the conveyor belt is moved vertically downwards while portions are placed successively on a platform of the vertical conveyor to form a stack.

With regard to the advantages thus achieved, reference is made, in their entirety, to the above descriptions relating to the first apparatus aspect of the invention.

According to a preferred development of the method, the feeder conveyor belt and the vertical conveyor are driven by means of at least one controller in such a way that the conveyor belt for conveying in the conveying direction and the vertical conveyor and the end of the feeder conveyor belt are driven in synchrony, i.e., are coordinated with each other, particularly preferably in a continuous or substantially continuous movement.

Other advantageous embodiments of the method are described in the other dependent claims. With regard to their advantages, reference is made, in their entirety, to the above descriptions and advantages of the apparatus, which apply analogously to the preferred methods, and to the following descriptions of the preferred embodiments. With the method according to the invention, it is possible, in particular, to produce stacks of separate portions gently and at high speed without any loss of quality on the part of the portions and with preferably continuous or semi-continuous movements.

BRIEF DESCRIPTION OF THE DRAWINGS

The invention shall now be described with reference to embodiments of the apparatus and the method, and with reference to the drawings, in which.

DETAILED DESCRIPTION

Figure 1:
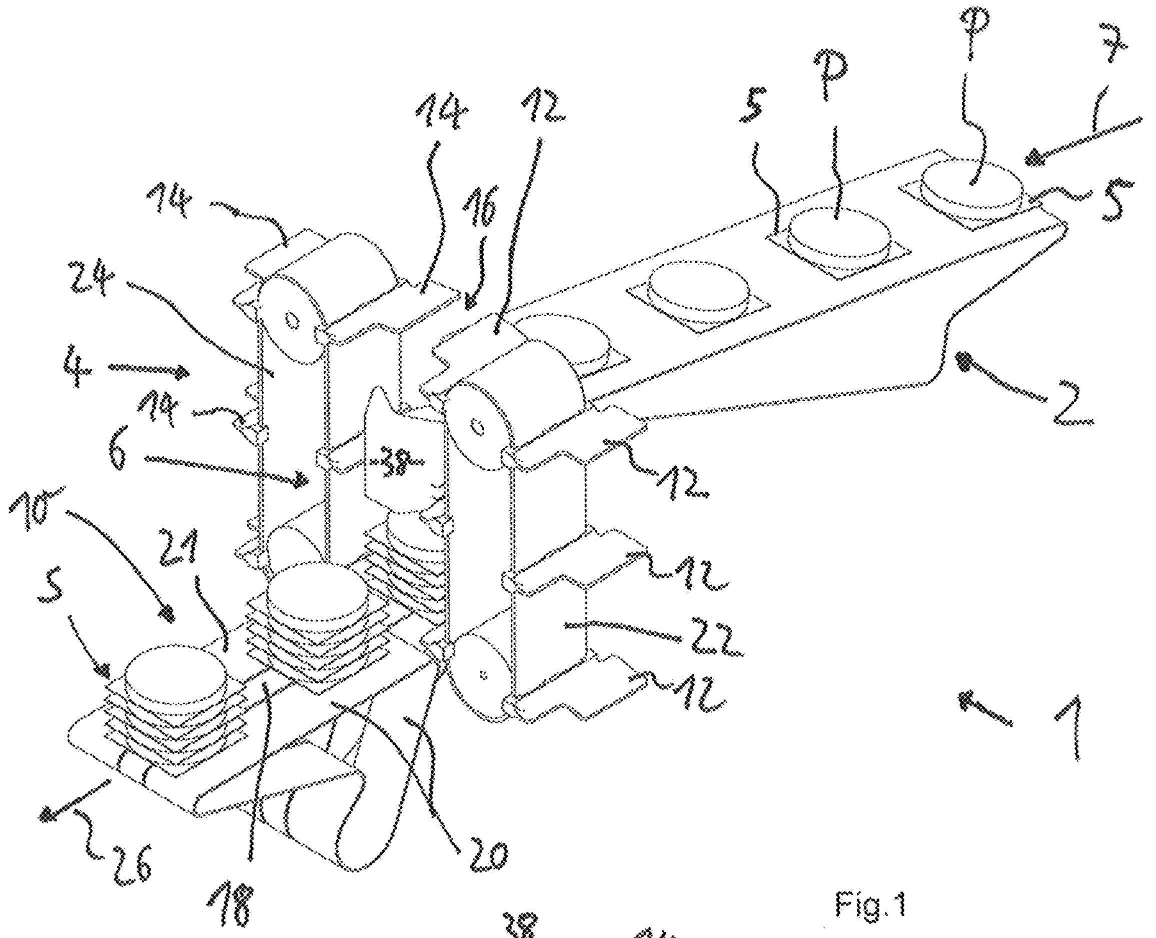
FIG. 1 shows a perspective view of the infeed side of an apparatus and method for stacking portions.
Figure 2:
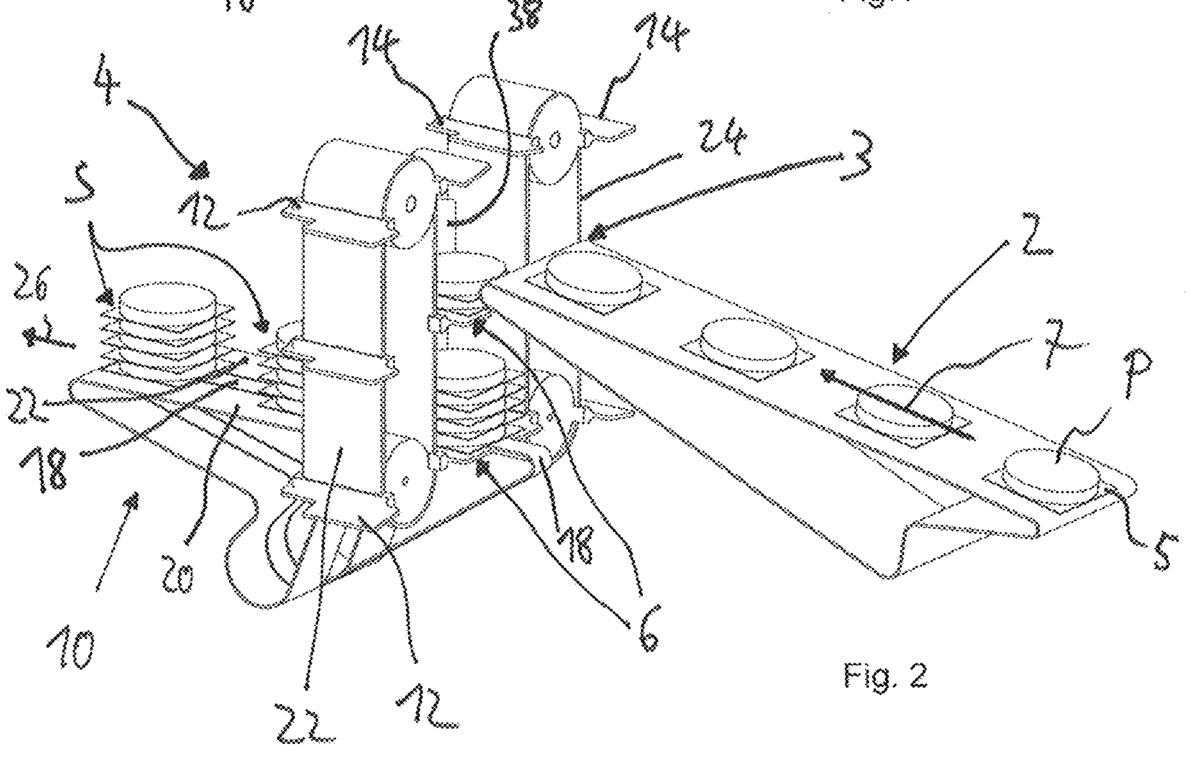
FIG. 2 shows a perspective view of the outfeed side of the apparatus and the method.
Figure 3:
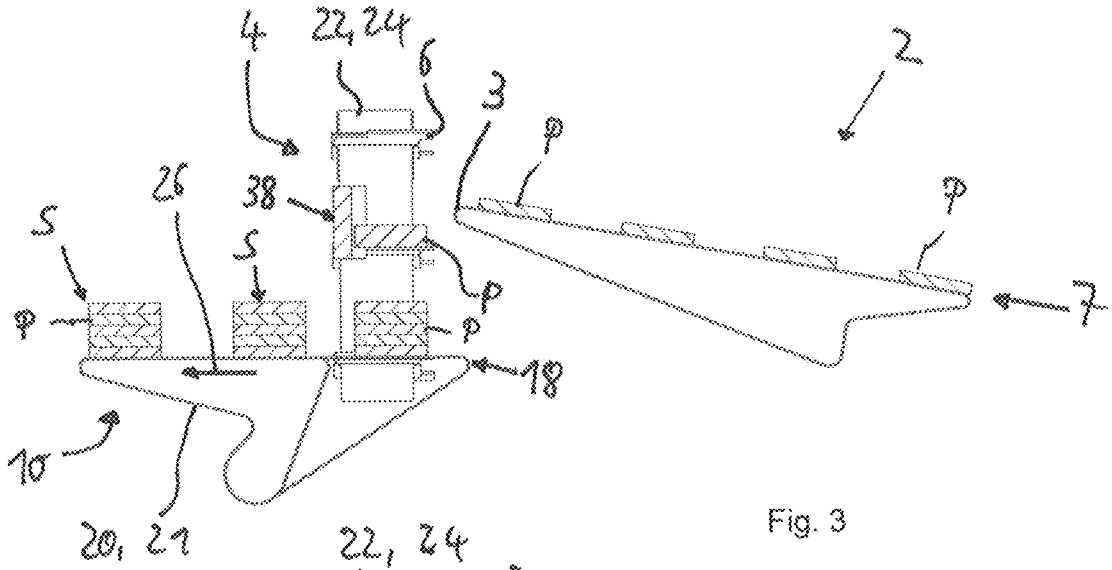
FIG. 3 shows a lateral cross-sectional view of the apparatus.

Apparatus 1, and the method which can be carried out therewith for stacking S portions P made of food mass, in particular patties, are described as follows.

As illustrated by FIGS. 1-8, apparatus 1 has a feeder conveyor belt 2 for feeding portions P in a conveying direction 7 and for dispensing portions P at one end of feeder conveyor belt 2, and a vertical conveyor 4 arranged downstream from feeder conveyor belt 2, for conveying the portions in a substantially vertical direction, and an outfeed conveyor belt 10 arranged adjacent vertical conveyor 4, onto which portions P can be dispensed from vertical conveyor 4.

The main components of apparatus 1 are mounted on a typical machine frame, not shown here in more detail, or on several such frames. In a variant of an embodiment known per se from the prior art, feeder conveyor belt 2 is part of a paper interleaver, and is mounted on the machine frame thereof, for example of the PI355 paper interleaver made by Vemag Maschinenbau GmbH. In an alternative embodiment, feeder conveyor belt 2 is mounted on the same machine frame on which vertical conveyor 4 is also mounted.

Figure 4:
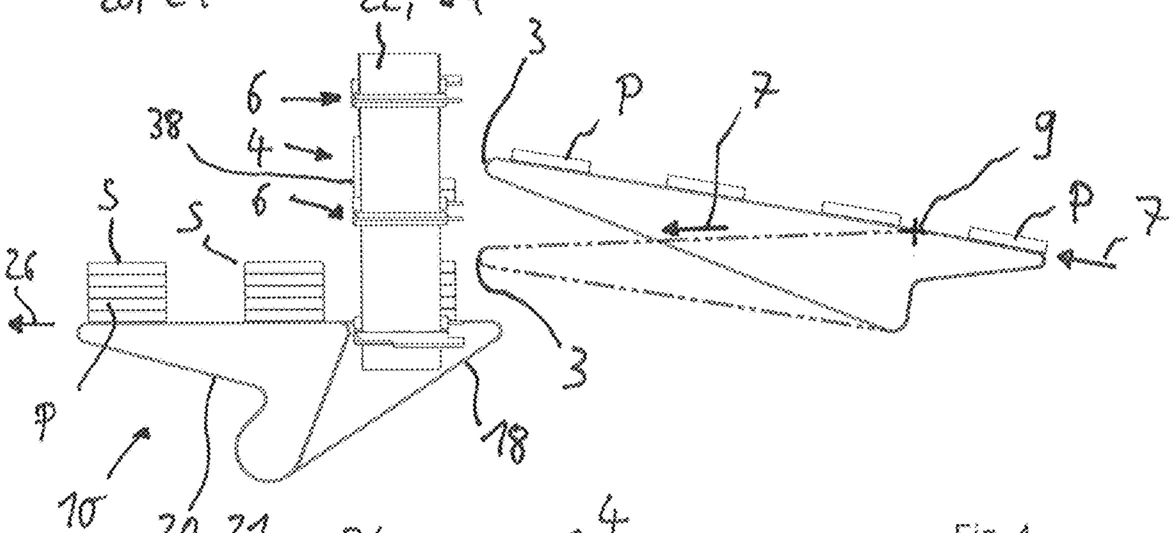
FIG. 4 shows a lateral view of the apparatus in different operating states of the feeder conveyor belt.
Figure 5:
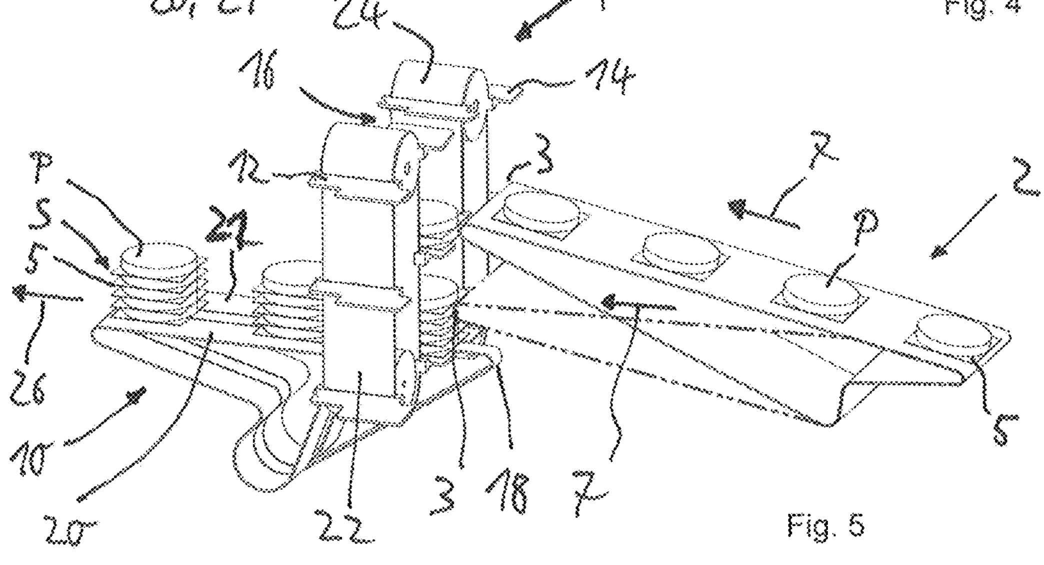
FIG. 5 shows a perspective view of the embodiment shown in FIG. 4.
Figure 6:
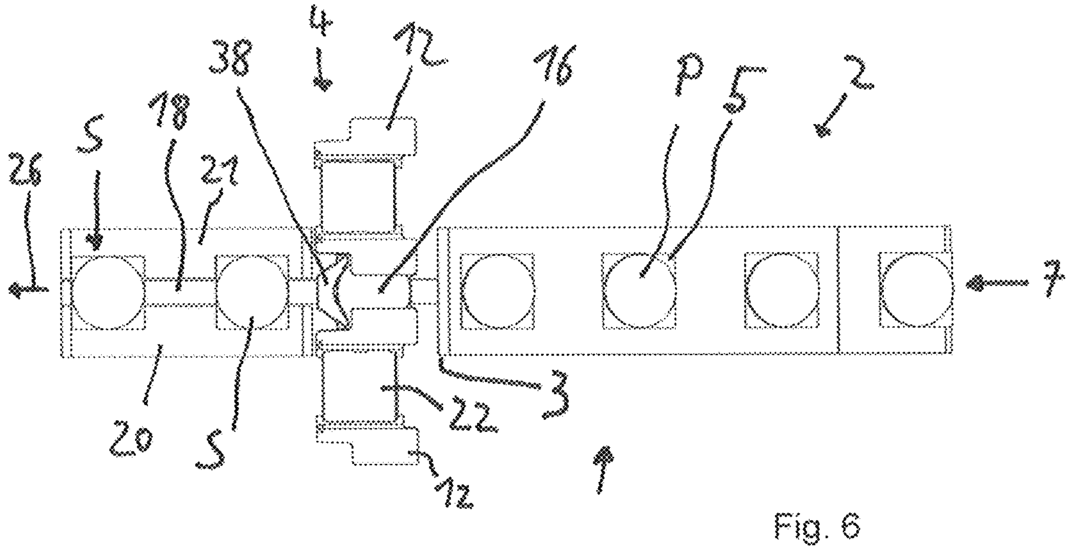
FIG. 6 shows a top view of the apparatus.
Figure 7:
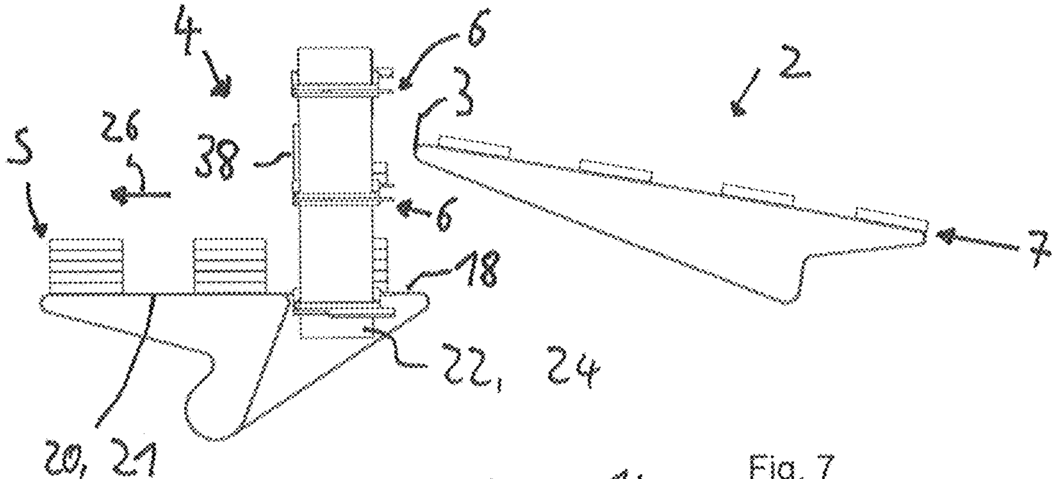
FIG. 7 shows a side view of the embodiment shown in FIG. 6.
Figure 8:
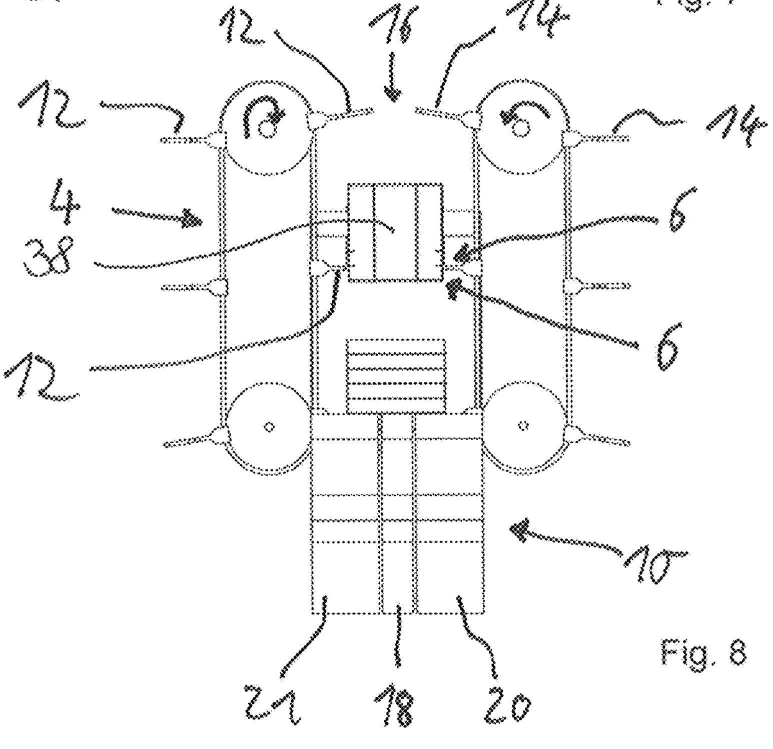
FIG. 8 shows an end view of the vertical conveyor and of the outfeed conveyor belt as seen from the end, outfeed side.

Feeder conveyor belt 2 is a circulating belt of the kind known per se from the prior art and according to the invention is mounted and drivable in such a way that the end 3 of conveyor belt 2 facing vertical conveyor 4 can be moved vertically up or down in a continuous or intermittent manner while portions P are being conveyed. To achieve that purpose, conveyor belt 2 is pivotably mounted to a rotary joint 9 in such a way, as shown schematically in FIG. 4, that end 3 is moved or is movable up or down into different positions, as illustrated by FIGS. 4 and 5 in particular. To achieve that purpose, a drive means 32, which can be controlled by means of a controller 8—see FIG. 9 and the description below—, is provided for moving the end 3 of feeder conveyor belt 2 and which produces the pivoting movement for moving end 3 substantially vertically. Drive means 32 can be a servomotor which is coupled by means of a gear transmission to conveyor belt 2, or alternatively it can also be a pneumatic cylinder.

In this embodiment, feeder conveyor belt 2 is preferably provided as a paper interleaver, in the form of the PI355 machine made by VEMAG Maschinenbau GmbH, with a device for feeding paper, and is designed in such a way that a piece of paper, a film or some other substrate 5 or even a container for receiving portions P can be arranged under a portion P lying on feeder conveyor belt 2.

As FIGS. 2 to 7 well illustrate, vertical conveyor 4 has a plurality of platforms 6 designed to receive, downstream from feeder conveyor belt 2, a plurality of portions P forming a stack S. The platforms 6 of the vertical conveyor, that in normal downward operation receive a stack S, and outfeed conveyor belt 10 are arranged relative to each other on the outfeed side in such a way that portions P can be dispensed directly from platform 6 onto outfeed conveyor belt 10.

Figure 9:
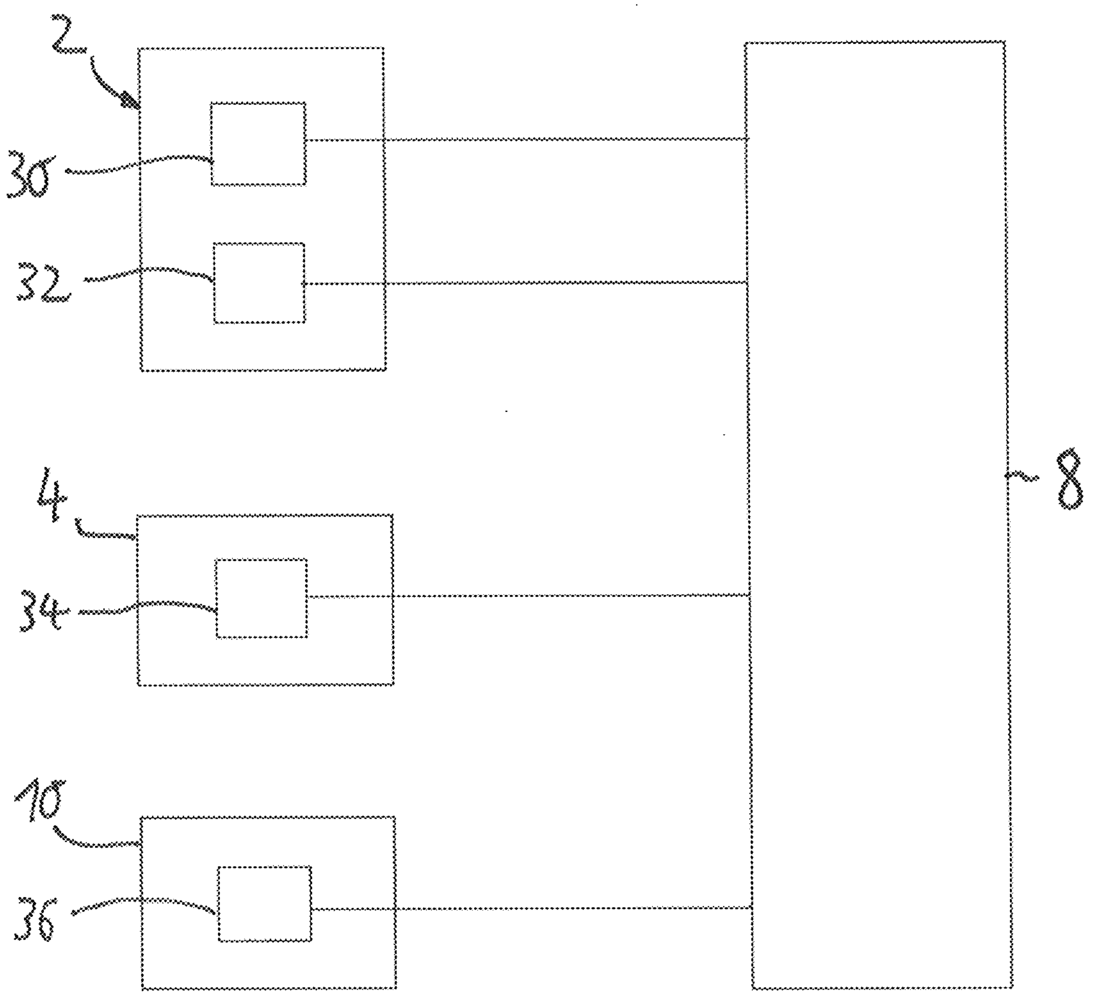
FIG. 9 shows a controller and schematically a plurality of drive means for different components of the apparatus.

Referring now also to FIG. 9, feeder conveyor belt 2 and vertical conveyor 4 are driven in operation by at least controller 8 in such a way that conveyor belt 2 for conveying in conveying direction 7 and vertical conveyor 4 and the end of the feeder conveyor belt 2 are driven in synchrony, particularly preferably in a continuous or substantially continuous movement.

As FIGS. 1 to 8 show, the platform 6 for receiving portions is effectively formed by at least two separate cooperating platform sections 12, 14. In the embodiment shown, a total of six pairs of platform sections 12,14 cooperate. The number can vary and depends on the number of portions P that form a stack S. Platform sections 12, 14 are spaced equidistantly apart on a circulating drive member 22, 24, which is provided in the form of a belt, a strap, a chain or the like. Circulating drive members 22, 24 and hence also platform sections 12, 14 can be driven synchronously by means of a drive means 34 (see FIG. 9), in order to form, for each stack S, a platform 6 for receiving portions and for conveying the portions and stack S vertically downwards for transfer to outfeed conveyor belt 10.

As illustrated by FIGS. 1, 2 and FIGS. 6 and 8, in particular, a gap 16 is formed at least temporarily between platform sections 12, 14 that is dimensioned in relation to the dimensions of portions P such that the latter and stack S being formed do not fall through gap 16, but are supported by the platform 6 that is formed.

As illustrated by FIGS. 1, 2, 5 and 8 in particular, outfeed conveyor belt 10 is provided with a conveyor belt section 18 which is dimensioned such that it is arranged at least partially inside gap 16 so as to be able to receive portions P and in particular a formed stack S from vertical conveyor 4. This happens when stack S has been moved so far vertically downwards by vertical conveyor 4 that the underside of the lower portion P of stack S comes into contact with the upper side of conveyor belt section 18 and that the latter bears the load of stack S, while the two platform sections 12, 14 are moved vertically further downwards and are no longer needed to support stack S and are then circulated further with the aid of circulating drive members 22, 24 until they jointly form a new platform 6 at the top by being arranged opposite one another. In the embodiment of apparatus 1, outfeed conveyor belt 10 has a central conveyor belt section 12 and two conveyor belt sections 20, 21 arranged laterally thereto, which are arranged parallel to each other and can be driven synchronously in a conveying direction 26 so as to be able to convey stack S further in conveying direction 26.

As FIGS. 1 to 8 show, the central conveyor belt section 18 is longer than the conveyor belt sections 20, 21 arranged lateral thereto, such that the central conveyor belt section 18 protrudes into the gap 16 between platform sections 12, 14 of platform 6. In operation, when platform 6 is moving downwards, a stack S comprising a plurality of portions P is initially placed on the central conveyor belt section 18 and can then be subsequently conveyed additionally in the conveying direction 26 by the laterally arranged conveyor belt sections 20, 21.

The standard electronic machine controller 8 shown schematically in FIG. 9 is configured with memories, processors and interfaces for operating and for signal transmission in such a way that a drive means 30 for the feeder conveyor belt, a drive means 32 of vertical conveyor 4, a further drive means 34 for moving the end 3 of feeder conveyor belt 2, and a drive means 34 of vertical conveyor 4 and drive means 36 of outfeed conveyor belt 10, can be controlled in a coordinated manner. The lines shown in FIG. 9 for the components symbolize respective lines for transmitting signals, in particular control signals, that are preferably emitted by controller 8. Signals, for example signals representing the position of a drive means, can also be transmitted in the opposite direction to controller 8.

As can be seen well in FIGS. 1, 3, 6 and 8, a product stop member 38 is arranged in the region of the vertical conveyor in such a way that portions P dispensed from feeder conveyor belt 2 onto a platform 6 for the stack S to be formed can come to rest there at stop member 3 on a platform 6. Product stop member 38 has the advantageous effect that the movement of the dispensed portions P in the conveying direction 7 of feeder conveyor belt 2 is interrupted, in other words that the ejected portion P is positioned reliably on the platform or on top of the stack. Product stop member 38 is preferably arranged on a frame section of the vertical conveyor and is preferably in a fixed position. Product stop member 38 is preferably adapted to the shape of the portions; as can be seen particularly well in FIG. 6, the surface of product stop member 38 facing the portions may be concave in shape, for example, and may also have a partly semicircular shape so as to be adapted to a substantially round shape of a patty. However, the stop member can also take other forms. Product stop member 38 is preferably also mounted adjustably, i.e., in different vertical positions, or also in different positions in the horizontal direction, on a frame section of the vertical conveyor. The material that product stop member 38 is made of may be elastically deformable or soft, in order to perform a certain damping function in that respect, or to slow the movement of the portions against the product stop member a little more gently. Product stop member 38 may preferably also be designed as an interchangeable part.

Further details of apparatus 1 and the method shall now be described.

When using the apparatus and carrying out the method, care is taken to ensure that feeder conveyor belt 2 is mounted and driven in such a way that, during conveying, the end 3 of conveyor belt 2 is moved vertically downwards while portions P are placed successively on a platform 6 of vertical conveyor 4 to form a stack S. Feeder conveyor belt 2 and vertical conveyor 4 are driven by means of controller 8 in such a way that the conveyor belt 2 for conveying in conveying direction 7 and vertical conveyor 4 and end of feeder conveyor belt 2 are driven in synchrony, particularly preferably in a continuous or substantially continuous movement. Platform 6 of the vertical conveyor for receiving a stack S, which is temporarily formed by cooperating platform sections 12, 14, and outfeed conveyor belt 10 are arranged in such a way, and drive means 30, 32, 34, 36 are controlled in such a way, that a stack S of portions P is successively dispensed directly from platform 6 onto outfeed conveyor belt 10, thus forming a plurality of stacks S.

In operation, what is achieved with the aid of controller 8 is that, while portions P are being conveyed in the conveying direction 7 of feeder conveyor belt 2, the end 3 of feeder conveyor belt 3 follows vertical conveyor 4 vertically downwards in its vertically downward movement, to form a stack S on a platform 6, and in another phase is then moved upwards in the opposite direction to the downward movement of vertical conveyor 4, and is then moved further downwards, in yet another phase, to form a successive stack S in the manner described above. A formed stack S of portions P is dispensed directly from the platform onto conveyor belt section 18 of outfeed belt 10, and stack S thus dispensed is then conveyed further by outfeed conveyor belt 10 in outfeed conveying direction 26, also with the aid of further conveyor belt sections 20, 21.

LIST OF REFERENCE SIGNS

1 Apparatus
2 Feeder conveyor belt
P Portions
S Stack
3 End of the feeder conveyor belt
4 Vertical conveyor
5 Substrate
6 Platform
7 Conveying direction of the feeder conveyor belt
8 Controller
9 Rotary joint
10 Outfeed conveyor belt
12 Platform section
14 Platform section
16 Gap
18 Central conveyor belt section
20 Lateral conveyor belt section
21 Lateral conveyor belt section
22 Drive member of the vertical conveyor
24 Drive member of the vertical conveyor
26 Conveying direction of the outfeed conveyor belt
30 Drive means for the feeder conveyor belt
32 Drive means for moving the end of the feeder conveyor belt
34 Drive means for the vertical conveyor
36 Drive means for the outfeed conveyor belt
38 Product stop member

The invention claimed is:

1. An apparatus for stacking portions of food mass, the apparatus comprising a feeder conveyor belt configured to feed the portions in a conveying direction and configured to dispense the portions at an end of the feeder conveyor belt;

a vertical conveyor arranged downstream from the feeder conveyor belt, the vertical conveyor configured to convey the portions in a substantially vertical direction, and the vertical conveyor having a platform that is moveable in the substantially vertical direction for receiving the portions downstream from the feeder conveyor belt; and a controller configured to synchronously drive the feeder conveyor belt, the vertical conveyor, and the end of the feeder conveyor belt, wherein the vertical conveyor is configured such that a stack including the portions can be dispensed from the platform for further transport, the feeder conveyor belt, the vertical conveyor, and the end of the feeder conveyor belt are synchronously driven by the controller in a continuous or substantially continuous movement, and the feeder conveyor belt is mounted and drivable such that the end of the feeder conveyor belt facing the vertical conveyor can be moved vertically up or down in a continuous or intermittent manner while the portions are being conveyed.

2. The apparatus of claim 1 further comprising:

an outfeed conveyor belt arranged adjacent to the vertical conveyor, the outfeed conveyor belt configured to receive the portions from the vertical conveyor;

a first drive means coupled to the feeder conveyor belt;

a second drive means coupled to the vertical conveyor;

a third drive means configured to move the end of the feeder conveyor belt; and a fourth drive means coupled to the outfeed conveyor belt, wherein the controller is configured to control the first drive means, the second drive means, the third drive means, and the fourth drive means in a coordinated manner.

3. The apparatus of claim 1 further comprising:

an outfeed conveyor belt arranged adjacent to the vertical conveyor, the outfeed conveyor belt configured to receive the portions from the vertical conveyor, wherein the platform of the vertical conveyor is arranged relative to the outfeed conveyor belt such that the portions can be dispensed directly from the platform onto the outfeed conveyor belt.

4. The apparatus of claim 3 wherein the platform has a first platform section and a second platform section between which a gap is formed at least temporarily, and the outfeed conveyor belt has a conveyor belt section that is dimensioned to be arranged at least partially inside the gap for receiving portions from the vertical conveyor.

5. The apparatus of claim 4 further comprising:

a first circulating drive member coupled to the first platform section; and a second circulating drive member coupled to the second platform section, wherein the first circulating drive member and the second circulating drive member are configured to synchronously drive the first platform section and the second platform section to form the platform and to transport the portions vertically downwards for transfer to the outfeed conveyor belt.

6. The apparatus of claim 1 wherein the feeder conveyor belt is configured to feed a substrate such that the substrate can be arranged underneath each portion lying on the feeder conveyor belt.

7. The apparatus of claim 1 further comprising:

an outfeed conveyor belt arranged adjacent to the vertical conveyor, wherein the outfeed conveyor belt has a central conveyor belt section and a pair of conveyor belt sections arranged laterally to the central conveyor belt section, and the pair of conveyor belt sections are arranged parallel to each other and can be driven synchronously in the conveying direction.

8. The apparatus of claim 7 wherein the central conveyor belt section is longer than the pair of conveyor belt sections, the central conveyor belt section protrudes into a gap in the platform, and wherein in operation, when the platform is moving downwards, the stack including the portions is initially placed on the central conveyor belt section and is then subsequently conveyed additionally in the conveying direction by the pair of conveyor belt sections.

9. A method for stacking portions of food mass, the method comprising:

feeding the portions in a conveying direction by means of a feeder conveyor belt;

dispensing the portions at an end of the feeder conveyor belt of a vertical conveyor; and serially placing a plurality of portions from the feeder conveyor belt onto a platform of the vertical conveyor that is movable in a substantially vertical direction, wherein the feeder conveyor belt is mounted and driven in such a way that, during conveying of the portions in the conveying direction of the feeder conveyor belt, the end of the feeder conveyor belt is moved vertically downwards while portions are placed successively on the platform of the vertical conveyor to form a stack.

10. The method of claim 9 wherein the feeder conveyor belt, the vertical conveyor, and the end of the feeder conveyor belt are synchronously driven by a controller.

11. The method of claim 10 wherein the feeder conveyor belt, the vertical conveyor, and the end of the feeder conveyor belt are synchronously driven by the controller in a continuous or substantially continuous movement.

12. A method for stacking portions of food mass, the method comprising:

feeding the portions in a conveying direction by means of a feeder conveyor belt;

dispensing the portions at an end of the feeder conveyor belt of a vertical conveyor;

serially placing a plurality of portions from the feeder conveyor belt onto a platform of the vertical conveyor that is movable in a substantially vertical direction; and dispensing the portions from the vertical conveyor onto an outfeed conveyor belt, wherein the feeder conveyor belt is mounted and driven in such a way that, during conveying of the portions in the conveying direction of the feeder conveyor belt, the end of the feeder conveyor belt is moved vertically downwards while portions are placed successively on the platform of the vertical conveyor to form a stack, wherein, while the portions are being conveyed in the conveying direction of the feeder conveyor belt, the end of the feeder conveyor belt follows the vertical conveyor vertically downwards in its vertically downward movement, in one phase, to form the stack including the portions, and in another phase the end of the feeder conveyor belt is then moved upwards in an opposite direction to the downward movement of the vertical conveyor and is then moved further downwards, in yet another phase, to form a successive stack of the portions, and wherein the platform of the vertical conveyor is arranged relative to the outfeed conveyor belt such that the stack including the portions is dispensed directly from the platform onto the outfeed conveyor belt.

13. A method for stacking portions of food mass, the method comprising:

feeding the portions in a conveying direction by means of a feeder conveyor belt;

dispensing the portions at an end of the feeder conveyor belt of a vertical conveyor;

serially placing a plurality of portions from the feeder conveyor belt onto a platform of the vertical conveyor that is movable in a substantially vertical direction; and dispensing the portions from the vertical conveyor onto an outfeed conveyor belt, wherein the feeder conveyor belt is mounted and driven in such a way that, during conveying of the portions in the conveying direction of the feeder conveyor belt, the end of the feeder conveyor belt is moved vertically downwards while portions are placed successively on the platform of the vertical conveyor to form a stack, wherein the platform has at least two separate platform sections between which a gap is formed at least temporarily, the outfeed conveyor belt has a central conveyor belt section that is dimensioned to be arranged at least partially inside the gap so as to be able to receive the portions from the vertical conveyor, the stack including the portions is placed directly from the platform onto at least one conveyor belt section of the outfeed conveyor belt, and the stack is subsequently conveyed further by the feeder conveyor belt in an outfeed conveying direction, wherein the stack is initially placed on the central conveyor belt section and is then conveyed additionally and further by a pair of conveyor belt sections in the outfeed conveying direction, and wherein the platform of the vertical conveyor is arranged relative to the outfeed conveyor belt such that the stack including the portions is dispensed directly from the platform onto the outfeed conveyor belt.

* * * * *